US012666126B2

(12) United States Patent
Shibata

(10) Patent No.: US 12,666,126 B2
(45) Date of Patent: Jun. 23, 2026

(54) ENCODES IMAGES FROM A SINGLE IMAGE SENSOR OF A SINGLE CAMERA INTO ALL EXISTING 3D FORMATS

(71) Applicant: Akira Shibata, Tokyo (JP)

(72) Inventor: Akira Shibata, Tokyo (JP)

( * ) Notice: Subject to any disclaimer, the term of this patent is extended or adjusted under 35 U.S.C. 154(b) by 103 days.

(21) Appl. No.: 18/570,349

(22) PCT Filed: Jan. 12, 2022

(86) PCT No.: PCT/JP2022/002972
§ 371 (c)(1),
(2) Date: Dec. 14, 2023

(87) PCT Pub. No.: WO2022/269967
PCT Pub. Date: Dec. 29, 2022

(65) Prior Publication Data
US 2024/0284029 A1     Aug. 22, 2024

(30) Foreign Application Priority Data

Jun. 22, 2021     (JP) ................................. 2021-002948

(51) Int. Cl.
*H04N 23/55*     (2023.01)
*H04N 13/161*     (2018.01)
(52) U.S. Cl.
CPC ........... *H04N 23/55* (2023.01); *H04N 13/161* (2018.05)

(58) Field of Classification Search
CPC .... H04N 13/161; H04N 13/243; H04N 23/50; H04N 23/55
See application file for complete search history.

(56) References Cited

U.S. PATENT DOCUMENTS

| | | | |
|---|---|---|---|
| 2012/0050578 A1* | 3/2012 | Aoki ................... | H04N 23/667 |
| | | | 396/529 |
| 2017/0188013 A1* | 6/2017 | Presler ................ | H04N 13/239 |
| 2018/0152550 A1* | 5/2018 | Dharmatilleke ....... | H04N 23/55 |
| 2023/0093930 A1* | 3/2023 | Murakami ........... | H04N 13/218 |
| | | | 359/823 |

FOREIGN PATENT DOCUMENTS

| | | |
|---|---|---|
| JP | 2002-77823 A | 3/2002 |
| JP | 2019-029876 A | 2/2019 |

* cited by examiner

*Primary Examiner* — Amy R Hsu

(57) ABSTRACT

Convert the output image signal of a single camera with a single imaging element into any 3D encoding format, record in that format, and use that format to display 3D videos and 3D photos on a video display. Aiming a 3D shooting lens with two light paths equivalent to the left eye and right eye at one imaging element of one camera; the left optical path image is formed on the left half divided centrally by the long side of the imaging element, and the right optical path image is formed on the right half. Set a light shield on the central boundary line to prevent the left optical path image from deviating to the right half, and the right optical path image from deviating to the left half, and convert the image formed on the imaging element into an undeformed or compressed image signal and output as it is.

1 Claim, 4 Drawing Sheets

1

2

3

4

5

18

19

20

ENCODES IMAGES FROM A SINGLE IMAGE SENSOR OF A SINGLE CAMERA INTO ALL EXISTING 3D FORMATS

TECHNICAL FIELD

This invention is in the field of 3D video technology, in which the two-optical images of the left and right eyes are encoded in any 3D format, recorded, and displayed on a display.

BACKGROUND TECHNIQUE

Traditionally, 3D (stereoscopic/stereo) moving images (videos) and photographs (still images) are produced using two video signals from two cameras.

Furthermore, there are no examples of 3D video being shot/produced using a single image sensor or a single set of three image sensors in the case of a three-chip camera.

If there would be, they would be restricted to Side-by-Side type encoding.

Additionally 3D video shooting/production using a single camera with two built-in image sensors is already being seen.

PRIOR ART DOCUMENTS

Patented Documents
  None
Unpatented Documents
  none

Problems that the Invention Aims to Solve

The challenge is to convert the output video signal of one image sensor of one camera into any 3D encoded format without delay, record in that format, and display 3D or 3D photos on any display.

The arbitrary 3D encoding formats include side-by-side, top-and-bottom, line-by-line, frame sequential, 3D video encoding (synthesis) formats for parallax barrier applications and lenticular applications, and are encoding formats that will be created in the future.

Means to Solve Problems

A single image sensor receives images from two optical paths for the left and right eyes of a photographic lens with a 3D adapter, endoscope, microscope, etc., dividing the image into the left side and right side areas at the center of the long horizontal side.

One video frame consists of left and right optical images arranged side by side without any deformation. This video is output from the camera using one piece of HDMI or SDI cable (one set of 4 cables for QUAD-SDI).

Connect this cable to a 2-input 1-output PCIe video capture card. Or split this cable into two cables and connect them to your PC (Personal Computer) via two sets of video/USB converters. If the left-eye equivalent image is cropped into a desired range size and aspect ratio, the right-eye equivalent image should be cropped into the same size and ratio, and these two images are used to be processed into any 3D encoding format. This image is displayed as 3D image on a 3D display.

Effect of Invention

Without a dedicated 3D camera this invention can make it possible to use the commercially available camera, lenses, microscopes, endoscopes, etc., because of the same processing and methods as for taking 2D video. When performing 3D encoding processing, a high-performance PC is faster than in-camera processing, and there is less delay before display.

Also, by using the same video stream twice, a difference between the left and right images can be created. This is not different from two images taken with two cameras, one camera for the left eye and another for the right eye.

Figure 1:
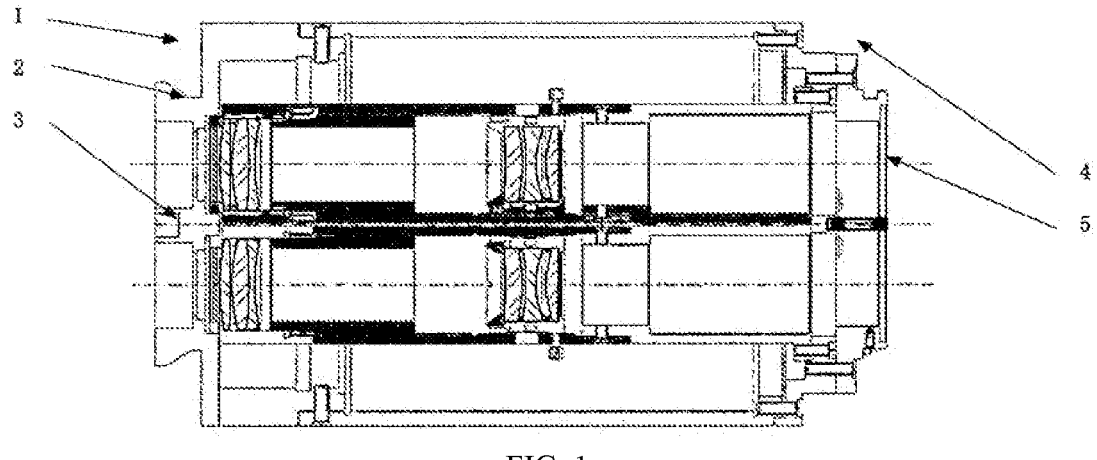
FIG. 1 is a cross-sectional view of the adapter tube that connects the objective lens and camera. A commercially available photographic lens, microscope, or endoscope can be attached to the lens mount, and a commercially available camera can be attached to the camera mount.
Figure 2:
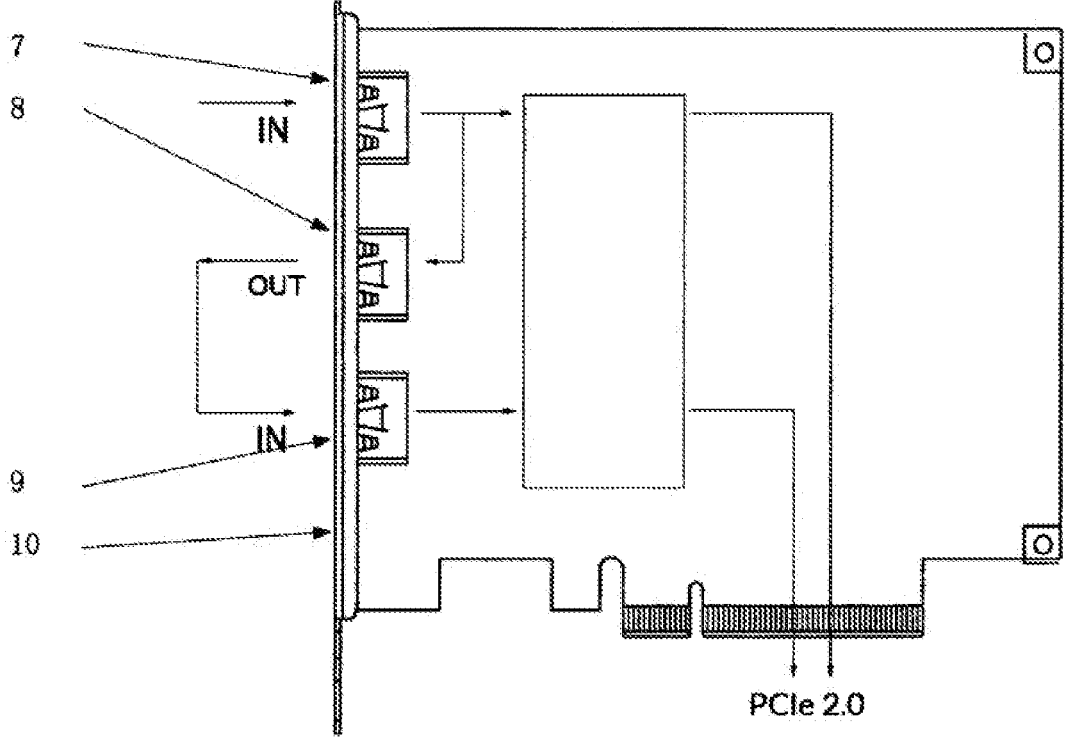
FIG. 2 shows the capture card and wiring cables diagram.
Figure 3:
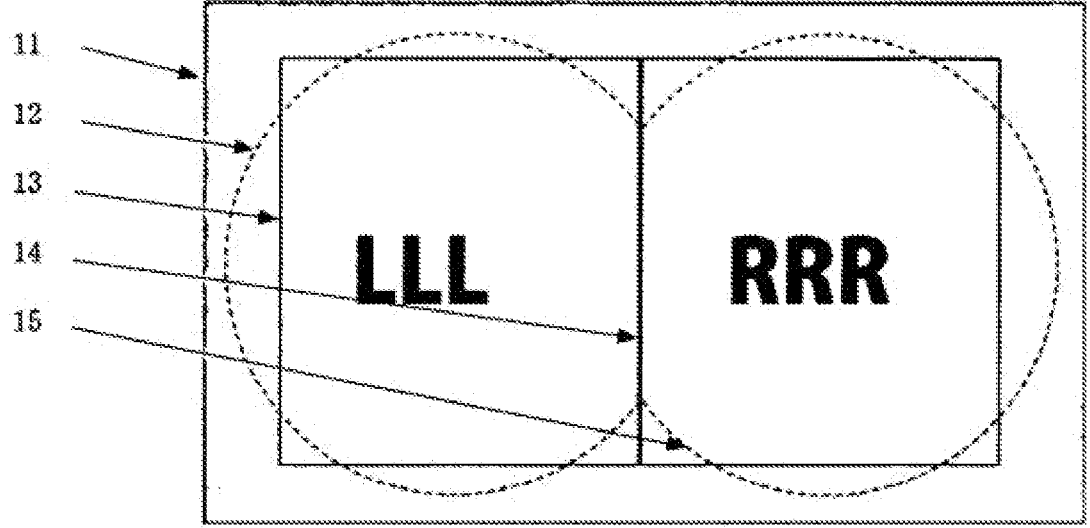
Figure 3:
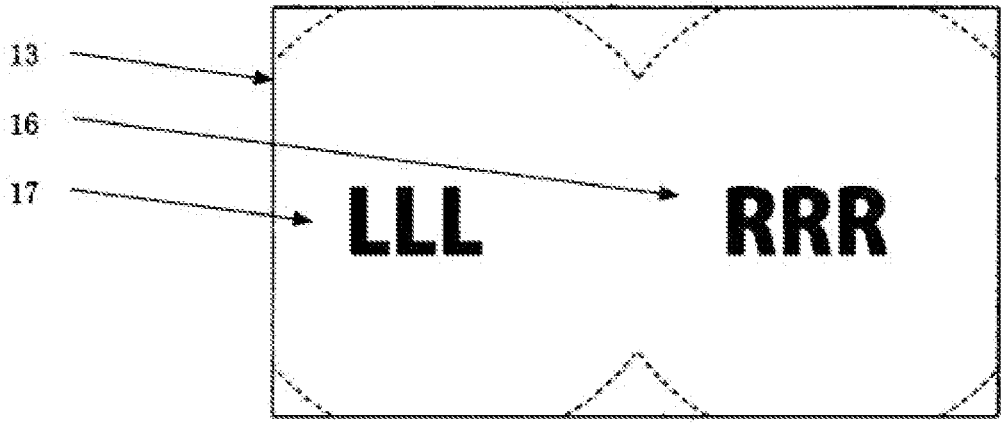

The upper part of FIG. 3 is a schematic diagram showing the optical image projected onto the image sensor inside the camera and its surroundings. The characters of LLL or RRR were added for explanation purposes and are not on the statue.

The lower part of FIG. 3 is a diagram of the structure in which the camera converts the received light image of the image sensor into an image with an aspect ratio of 16:9. Aspect ratio can be 4:3, 3:2, 1:1 or any other aspect ratio.

Figure 4:
Figure 4:
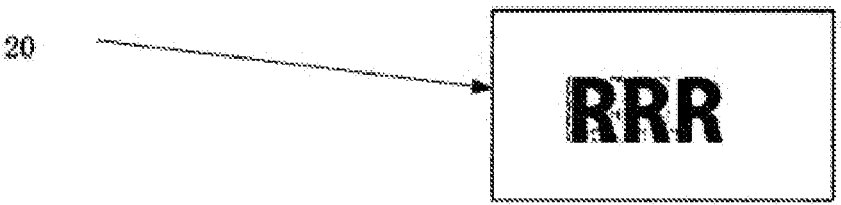

The upper part of FIG. 4 is an image of the above video with the left eye image cropped at 16:9 and the right eye image cropped at the same aspect ratio and field of view. In reality, each screen is the same size as in FIG. 4.

The lower part of FIG. 4 is a schematic diagram of an image encoded into 3D on a PC using the left-eye image and right-eye image above.

FORM FOR IMPLEMENTING IDEAS

One piece of camera with one piece of image sensor is mounted on one piece of camera with one piece of image sensor which takes two images of the left and right eyes. This video signal is output from the camera using one cable (4 cables for QUAD-SDI) and then is distributed through a distributor to two cables. Connect them to your PC via two USB converters.

Alternatively, a PCIe capture card with 2 video input terminals and 1 output terminal may be used, but the input video signal is split into 2 lines within the card, and one line passes through to the PC processing and another line exits from the PC and then making a U-turn come back again to the PC. i.e. that same video signal is returned through the card into the PC and will be processed for 3D encoding by the following application software.

The first or direct image equivalent to the left (or right) eye is cropped to an arbitrary aspect ratio. And the second U-turned image of the right (or left) is also cropped to the same aspect ratio as the first image the right (or left) eye. Using these cropped two images the application software can encode to any 3D video format.

EXAMPLE

Remove the binoculars from the surgical microscope, attach the invented adapter, and mount the 35 mm camera. Connect the camera image to the PCI/video card inserted into the PC, crop the two video outputs of the video card using the application software installed on the PC, encode the same subject area into one of 3D formats, and output to the 3D display.

Then, it will be displayed in 3D video or photo.

INDUSTRIAL APPLICABILITY

In the present invention, two optical images of the left and right eyes are captured on a single image sensor, two video streams corresponding to the left and right eye images are cut out using a PC external to the camera, and 3D encoding is performed using these two streams and then 3D videos and 3D photos can be watched. Therefore, it only requires one camera, is economical, does not require a special 3D camera, and is compact and easy to use. It will be used for both consumer and professional purposes, but it will be especially useful in the medical field by mounting it on operating microscopes, slit lamp microscopes, and endoscopes to popularize heads-up surgery. Visual inspection equipment in the medical and radiology fields converts from 2D photos and videos to 3D images.

In addition, it is possible to avoid delays on a single PC, create two streams with parallax between the left and right eyes from a single video stream, encode them in any format, record them, and output them for display, making it possible to expand the field. No matter what, 3D viewing will be done in the most suitable encoding format.

EXPLANATION OF SYMBOLS

1. Objective lens mount
2. Right light path
3. Left light path
4. Camera mount
5. Visor 6. Adapter tube
7. Video input terminal
8. Video output terminal
9. Video input terminal
10. Capture card
11. An optical image is projected around the image sensor inside the camera. LLL or RRR's images are actually reversed.
12. Image circle of left light path
13. Image sensor
14. Boundary assuming the effect of a light shielding plate
15. Right light path image circle
16 Left optical path image on the left side on one frame
17. Right light path image on the right side on one frame
18. Crop the left optical path image. Image of only the left optical path in one frame
19. Crop the right optical path image. Image of only the right optical path in one frame
20. 3D encoded video of 18 and 19 above on PC

What is claimed is:

1. A method of connecting a capture card's output terminal and its input terminal, with one HDMI or SDI cable to connect a camera to the capture card; the capture card comprises a first independent input terminal, a second independent input terminal, and a loop-through output terminal, the capture card splits one input video stream into two: one from the first independent input terminal for PC processing and another for the loop-through output terminal; via a connected cable between the loop-through output terminal and the second independent input terminal, the video stream for the loop-through output terminal goes out and returns again through the second independent input terminal to the capture card and reaches the PC processing.

* * * * *